(12) United States Patent
Heizmann et al.

(10) Patent No.: US 8,334,969 B2
(45) Date of Patent: Dec. 18, 2012

(54) OPTOELECTRONIC SENSOR AND METHOD FOR THE MEASUREMENT OF DISTANCES IN ACCORDANCE WITH THE LIGHT TRANSIT TIME PRINCIPLE

(75) Inventors: Reinhard Heizmann, Glottertal (DE); Gottfried Hug, Waldkirch (DE); Martin Marra, Freiburg (DE); Bahram Torabi, Freiburg (DE)

(73) Assignee: Sick AG, Waldkirch (DE)

( * ) Notice: Subject to any disclaimer, the term of this patent is extended or adjusted under 35 U.S.C. 154(b) by 553 days.

(21) Appl. No.: 12/591,256

(22) Filed: Nov. 13, 2009

(65) Prior Publication Data
US 2010/0128247 A1   May 27, 2010

(30) Foreign Application Priority Data
Nov. 21, 2008   (EP) .................................... 08105845

(51) Int. Cl.
*G01C 3/08* (2006.01)
(52) U.S. Cl. ..................... 356/5.01; 356/3.01; 356/4.01; 356/5.1
(58) Field of Classification Search .................. 356/4.01, 356/5.01
See application file for complete search history.

(56) References Cited

U.S. PATENT DOCUMENTS

| 5,633,706 A * | 5/1997 | Cho et al. ..................... 356/5.01 |
| 2002/0094786 A1 * | 7/2002 | Berliner et al. ............... 455/67.4 |
| 2006/0119833 A1 * | 6/2006 | Hinderling et al. .......... 356/5.11 |
| 2009/0173874 A1 * | 7/2009 | Wany ........................... 250/214.1 |

FOREIGN PATENT DOCUMENTS

| DE | 10 2005 021 358 A1 | 11/2006 |
| DE | 10 2006 048 697 A1 | 4/2008 |
| EP | 1 972 961 A | 9/2008 |

* cited by examiner

*Primary Examiner* — Luke Ratcliffe
(74) *Attorney, Agent, or Firm* — Nath, Goldberg & Meyer; Jerald L. Meyer; Stanley N. Protigal

(57) ABSTRACT

An optoelectronic sensor (10) for the measurement of distances or distance changes in accordance with the light transit time principle is provided having a light transmitter (12) for the transmission of a light signal and having a light receiver (16) for the reception of the remitted or reflected light signal, wherein an evaluation unit (18) is provided which is made to fix the transmission time for the light signal relative to a reference time and to digitize the received light signal on a sampling pattern (108) having a sampling period to determine the reception time of the light signal, and wherein a time base unit (38) is provided by means of which the transmission time can be shifted relative to the sampling pattern (108) with a time precision below the sampling period. In this respect, the time base unit (38) is made to derive the time shift from a first time signal having a first frequency (f1) and a second time signal having a second frequency (f2) different from the first frequency (f1) and to provide any desired time shifts with a time resolution given by the difference period belonging to the first and second frequencies (f1, f2).

15 Claims, 7 Drawing Sheets

Figure 1:
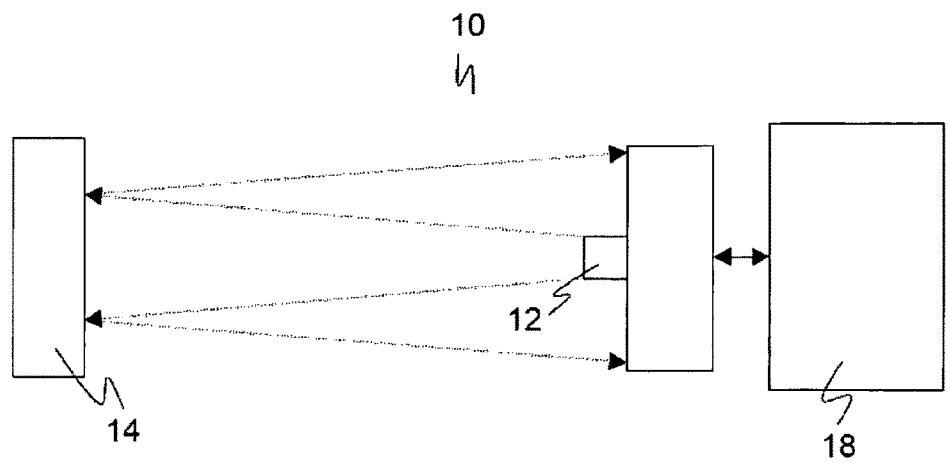

OPTOELECTRONIC SENSOR AND METHOD FOR THE MEASUREMENT OF DISTANCES IN ACCORDANCE WITH THE LIGHT TRANSIT TIME PRINCIPLE

The invention relates to an optoelectronic sensor and to a method for the measurement of distances or distance changes in accordance with the light transit time principle in accordance with the preamble of claim 1 and claim 12 respectively.

The distance of objects can be determined in accordance with the known light transit time principle using optoelectronic sensors. For this purpose, in a time of flight process, a short light pulse is transmitted and the time up to the reception of a remission or reflection of the light pulse is measured. Alternatively, in a phase process, transmitted light is amplitude modulated and a phase shift between the transmitted light and the received light is determined, with the phase shift likewise being a measure for the light transit time. Due to eye protection regulations, the last named phase modulation processes are in particular less suitable with low-remitting targets due to the required large integration times. In the pulse process, the integral power can be profitably used such that short pulses can be transmitted at a high energy density and the signal-to-noise-ratio is thus improved for the single shot.

The distance measurement can be necessary, for example, in vehicle safety, in logistics automation or factory automation or in safety engineering. A distance measurement device based on a reflected light beam can in particular respond to a distance change of the reflector or of the reflecting or remitting target. A special use is a reflection light barrier in which the distance between the light transmitter and the reflector is monitored. The light transit time process is also the principle according to which distance measuring laser scanners work whose position vector measures a line or even an area.

If the resolution of the distance measurement ought to reach a precision in the range of a few tens of millimeters, the light transit time must be determined exactly in an order of magnitude of hundreds of picoseconds. To achieve a distance resolution of a millimeter, six picoseconds have to be covered metrologically. Such a precision can only be realized with very cost-intensive electronics with conventional systems.

More cost-effective components such as FPGAs (field programmable gate arrays) and other programmable digital logic components typically have operating frequencies in the range of some hundreds of MHz. Nanoseconds, but not picoseconds can thus be resolved.

It is therefore necessary for high time precision to achieve precisions below, i.e. better than, these working frequencies. Since it is not a question of the absolute position between the transmission time and the sampling of the received signal for a light transit time measurement, higher resolution can be achieved by shifting the transmission time or the reception time.

A sensor is known from DE 10 2006 048 697 A1 in accordance with the light transit time principle in which the transmission times relative to the reception time can be selected by a special implementation of a direct digital synthesis (DDS). It is, however, shown in this respect that the theoretical resolution of the phase positions are not always reached in practice. Commercially available DDS components which provide phase positions in the desired resolution range are simply too expensive for many applications.

It is known from the still unpublished EP application of the same applicant with the file reference 08101432.6 to increase the sampling rate by parallel lines, with each line delaying the signal by an increasing fraction of the sampling period so that a number of sampling points corresponding to the number of lines is produced in each sampling period. To compensate a jitter of the delay lines, an additional delay of the received pulse is applied so that so-to-say the delays of the delay lines are swapped cyclically among one another. This additional delay is generated in that two frequencies are moved through, for example in the ratio 7 to 8, which are displaced with respect to one another by a further multiple of a difference period with every further sampling period. It is, however, not possible with this method to fix a transmission time with the difference period since the two frequencies only run through and thus provide at a given time the offset which is just being applied and not a desired offset. The known method also does not have the goal of setting a desired offset, but it is in contrast rather directed to run through the offsets uniformly since only then is the jitter averaged out.

It is therefore the object of the invention to provide a cost-effective possibility for the distance measurement in accordance with the light transit time principle with a higher time precision.

This object is satisfied by an optoelectronic sensor in accordance with claim 1 and by a method for the measurement of distances or distance changes in accordance with claim 12 respectively.

The solution in accordance with the invention starts from the idea of utilizing the difference period of two slightly different frequencies. Since a record is kept of the period in which the two frequencies are respectively located, time intervals can thus be decoupled whose precision is given by the difference period.

It is important to note that the resolution is not necessarily the same as the difference period. This is the case at a ratio of the two frequencies of n/(n+1) and such a ratio is also preferred. The example of other co-prime numbers such as ⅜ shows that the difference frequency 5 admittedly fixes the precision, but is not identical with it, since the smallest possible offset is also 1 in such a system. The offsets here do not increase monotonously with time, but all necessary offsets are equally present after a sorting as in the clearer case n/(n+1). In this observation, the units were cut; the consideration does not change if each number is multiplied by a common base frequency, for example by 10 MHz.

The invention thus has the advantage of increasing the resolution given by the sampling pattern and thus the measurement precision. In this respect, simple circuits or software solutions can be use so that the solution in accordance with the invention is very cost-effective.

The time base unit is preferably made to derive the first frequency and the second frequency from a master clock which also determines the reference time and to synchronize the first frequency and the second frequency to the master clock regularly. Only one stable clock is thus required and the two frequencies can run apart to the maximum over the synchronization window. In this respect, the synchronization can take place each time when the periods would theoretically have to coincide, in the example of 400 MHz and 410 MHz therefore every 100 ns, or only every nth time, that is in multiples of 100 ns.

The time base unit preferably has a first PLL having a first divider of the master clock for the first frequency and a second PLL having a second divider of the master clock for the second frequency, with in particular the first divider and the second divider being selected such that a difference period which is as small as possible arises in the range of some hundreds or some tens of picoseconds or a few picoseconds. A numerical example is a master clock from 10 MHz and a divider pair 40/41. Depending on the stability of the PLLs and of the presets of the digital components used, larger dividers and thus shorter setting possibilities can be provided. The two dividers should be co-prime with respect to one another; they should preferably satisfy the relation n and n+1. A selection which is not co-prime does not produce any improvement, for instance at 5 and 10, or produces an improvement which is not used ideally, for instance at 42 and 40.

The evaluation unit and/or the time base unit is preferably implemented on a digital logic component, in particular an FPGA (field programmable gate array), PLD (programmable logic device), ASIC (application specific integrated circuit) or DSP (digital signal processor). Such digital components allow an evaluation adapted to the application and a simple generation of the required two frequencies, for instance when the FPGA already has PLLs with settable dividers.

The time base unit preferably has a first counter and a second counter to count the complete periods of the first or second frequencies, with the counters in particular having triggered shift registers and with the time base unit being made to generate the time shift as a time interval between the nth period of the first frequency and the mth period of the second frequency. A pair from specific periods of the two frequencies delivers time increments below a time pattern preset by the sampling. If the frequencies satisfy the aforesaid n, n+1 relation, the sorting is simpler. It is sufficient if pairs are available to fill a sampling period since larger times can then be generated by addition of whole sampling periods. Alternatively, however, pairs can also be evaluated beyond a sampling period. The counters are reset accordingly with each synchronization or with each nth synchronization.

The time base unit is preferably made to extend the time shift by periods of the first frequency, of the second frequency or of the master clock. Time shifts which can be as much longer as desired can thus be generated.

The evaluation unit is preferably made to trigger the transmission of a light signal at a transmission time in a respective measurement period and to sample the received light signal and to accumulate a histogram of such received light signals over a plurality of measurement periods to determine the reception time from the histogram and the light transit time from it. Such a statistical approach also enables measurements when the individual measurement is very noisy, for example with unfavorable lighting scenarios, large distances or dark targets. The histogram approach also increases the measurement precision under favorable conditions, however.

In an advantageous further development, a unit for the fine setting of a transmission time is provided which is made to shift the respective transmission time within the measurement periods by an offset, with the offsets forming a distribution whose center of mass forms a desired transmission time and which can be selected with a time resolution which is better than both the sampling period and the difference period, in particular with a time resolution of fewer than ten picoseconds or even less than one picosecond. It is not the discrete time pattern which is further refined here, but the time resolution is rather increased despite an existing time pattern beyond its resolution. In this respect, the time pattern refined by the time base unit forms a particularly good starting position for actual transmission times. The time position of the transmitted light signals is then admittedly not improved with respect to the time pattern for the single shot, but very much so for a group of single shots. The desired transmission time, that is ultimately a phase of the group of single shots, is achieved via bin counts and thus actually via a center of mass set via statistical amplitude information. The degrees of freedom for the center of mass position are in turn basically unlimited since it only depends on the number of repetitions, that is on the plurality of measurement periods. Time precision is thus compensated by response time, with this not playing any role for most applications since a sufficient number of repetitions already takes place in a very short time so that the monitored region or the target can continue to be assumed to be quasi-statistical. Technical limits for the setting of the actual transmission time of each individual light signal are thus overcome. The effective transmission time can be selected with practically any desired precision and thus enables very high measurement precision. The desired transmission times are reliant neither on a time pattern of the digitization or a work cycle of a digital component nor on the smallest possible shift for the transmission time. The precision reached in the picosecond range or even below it is not achievable for the sampling itself or only with a very large effort and/or cost. This embodiment invention ultimately makes it possible by a skillful programming of a digital component, that is by a very cost-favorable solution, to dispense with such complex hardware or to overcome the limits of such hardware.

It must be emphasized in this respect that transmission times are in each case not to be understood absolutely, but relatively to the reception time. It is thus therefore absolutely possible to consider the situation from a different perspective and to speak respectively of shifted reception times or of a fine adjustment of the reception time. This will not be differentiated in language in the following and in the claims. The interval between the transmission time and the reception time can in particular in each case be shifted in time as a whole without it affecting the measurement result. Such a common shift of transmission time and reception time is consequently not meant by transmission time delay; it can always optionally take place additionally. In a similar manner, terms such as offset or transmission time delay cover shifts on the time axis both in the positive and in the negative direction.

The distribution of the offsets is preferably unimodal, in particular in accordance with a triangular, parabolic or Gaussian function, with a memory being provided in which a table for the unit for the fine setting of a transmission time is stored which holds an associated offset distribution for a plurality of time increments, in particular one respective offset distribution for time increments distributed evenly over a sampling period and/or over the time interval between two discrete times. Such distributions have a particularly pronounced center of mass and thus high time precision. In this respect, the distribution is formed from some sampling points which correspond to actual transmission points and from associated counts, that is repetitions for particularly this offset and thus ultimately amplitude information. The functions given in this respect form an envelope over the bins. The number of the sampling points should be selected in accordance with a compromise from a distribution which is as tight as possible and from a sufficiently precise imaging of the center of mass and of the envelope, that is for example from 3 to 11 sampling points, or particularly preferably from 5 to 7 sampling points. In this respect, the well-defined center of mass is generally more important than the faithful reproduction of the envelope so that discretization errors in the setting of the distribution are preferably taken into account at the cost of the shape and not of the center of mass.

A Gaussian distribution is in particular advantageous since it not only has a defined center of mass, but is rather also robust with respect to jitter. In contrast, jitter due to fluctuations in the ambient light or tolerances of the electronics is even desired. The discrete sampling points in the distribution are thus smeared into one another; the plurality of transmitted light pulses thus not only forms a discrete approximation to a Gauss, but even an almost continuous Gauss. If it is assumed that the jitter corresponds to white noise, the Gauss will thereby possibly be a little distorted, but maintains its essential properties.

The table used is in precise terms a table of tables: A separate table is stored for each time increment which can be set by distributions, namely a table with the counts which are required with respect to the sampling points and which thus gives the distribution. What was said above, that the well-defined center of mass in accordance with the time increment is more important than the faithful imaging of the envelope applies to every single one of these distributions because a shifted center of mass would already introduce a measurement error induced by the principle. The transmission time can be displaced by the time increment as desired with the help of the table. It is sufficient in this respect if the table holds entries up to the next rougher period, that is up to the settable actual transmission times; however, it can generally also include more entries.

A level determination unit is provided in an advantageous further development which is made to utilize the area of the received signal recorded in accumulated form on the histogram as a measure for the level, in particular by forming the sum of amounts over the bins after the noise level had previously been subtracted from each bin. The noise level can be determined as the mean value over all bins, for example. The sum of amounts of the received signal is not necessarily formed over the total histogram, but also only over the time range in which the received signal is disposed. This is the better measure since otherwise the noise-caused fluctuations are included in the level measurement. Conversely, the noise level is also not formed over all bins, but over bins outside the region of the received signal, preferably in the region not optically visible.

The evaluation unit is preferably made for a distance correction which compensates a remission-dependent shift on the basis of the level measurement. The remission-dependent correction or black-and-white correction required for this, that is the relationship which indicates a correction value for the light transit time for each level, can be taught in advance and can be stored as a table or as a correction function. The level measurement can also be evaluated to check the state of the optical components, for example, adjustment, contamination or the transmitted light speed.

The evaluation unit is furthermore preferably formed for a time encoding process in which the transmission times are acted on by an additional encoding offset and this is subtracted again for the evaluation, in particular by randomized or determined mixing of the distribution or by an additional center of mass shift. Such encoding processes have the purpose of differentiating the transmitted light signal from interference light, with interference light also being able to be a late reflection of a self-transmitted light pulse or of a sensor of the same construction. Such interferers are smeared by direct jumping on the time axis, which can be compensated in the evaluation, or by "blurring" and do not stand out, or at least do not stand out as much, from the noise level. Alternatively or additionally, the signal shape itself can be encoded, that is the shape of every individual signal, to recognize its own light signal on the reception.

The evaluation unit is preferably made to check with reference to a transition condition of the received light signal whether the light signal is received at an observation time, with a regulator being provided which is made to adjust the transition time or the desired transmission time by means of an additional transmission delay time such that the transition condition is satisfied at the observation time. In this respect, the underlying idea is not considering a measurement as a unique process in which, for example, the measured value is determined once and is output without the sensor then continuing to remain active. Instead, the then currently available information is used constantly to keep the measured result current. A precise and valid measured value is always available because the regulation always adjusts the measurement. Errors due to noise or dynamics in the monitored zone are avoided. The regulator works without thresholds and so fast. The procedure would even be superior for a single measurement without subsequent regulation because the regulation algorithm locates the measured value in a much shorter time than, for example, nested intervals or a sequential shift. If the regulator enters transient oscillation in a few cycles, a precise measured distance value is available over the required transmission delay time from this time onward. An approximation is already determined during the transient oscillation and then delivers a more and more precise measured value by the regulation.

It is accordingly regulated to an observation time which is fixed relative to the transmission time and whose selection is largely as desired, but is preset independently of the measurement. The observation time always remains the same although the invention does not generally prohibit changing it. This observation time only has to be known for the regulation; it is not changed by the regulation and does not influence the regulation, provided it is only selected reliably. For example, the observation time is placed to the maximum measured distance, to the end of a measurement interval shortly before the transmission of the next light signal or fractions thereof. The observation time which is thus always the same is the sum of the transmission delay time which is set by the regulator and which is the control parameter for the regulator and the light transit time so that the latter can be determined simply. Constant time portions such as electrical signal propagation times are best eliminated in advance by calibration.

In an advantageous further development, a regulation time interval within which the regulator can check the transition condition and can adjust the transmission delay can correspond only to a partial range of a measurement range of the sensor, and a change of position monitoring unit is provided to check periodically the time at which the received signal is received and, if this time is outside the regulation time interval, to set a new regulation time interval for the regulator, with the change of position monitoring unit having an agent, that is a process which is active constantly or in regular assigned time slots and which is independent of the regulator and with the agent having the aim of locating a valid regulation time interval and of setting it for the regulator in which the light signal of the target object is actually received.

The regulator thus always works in an environment of the measured value being sought, that is converges fast and does not remain incorrectly on a noise signal or on a target which has become no longer present in the meantime. The location of the received signal is only possible and necessary in the sampling pattern in this connection, not a precise measurement, so that the regulator is given a sensible working range. For example, the regulation time interval can be selected such that it contains a monotonous portion of the first falling flank of the received signal to be able to regulate a jump to the first zero crossing without risk. Presetting a regulation time interval therefore means the rough setting of the transmission delay time. The observation time is not changed in this respect; at least, it is not necessary if it was initially selected with a sufficient interval. This procedure allows a very fast approximation to a new measured value.

A (software) agent decouples the actual regulation and the location of the regulation time interval; it is therefore more robust and easier to handle. The agent does not only have the aim of initially finding a correct regulation time interval, but rather of always checking this regulation time interval and of correcting it, where necessary, that is to carry out a constant adjustment of the measured value as the result. The agent thus reacts in a higher ranking manner to noise or dynamics in the monitored zone and reacts by a setting of the regulator to a sensible regulation time interval in which the received signal being sought or the signature being sought is really to be found. The independence of the process can actually be implemented in its own hardware path or, in software language, in the sense of a separate thread or task. It can, however, also only be understood conceptionally, whereas the real implementation, for example, implements the agent as a periodically called up part of the regulator.

A filter element is preferably provided in the reception path between the light receiver and the evaluation unit to convert the unipolar received signal into a bipolar signal, with the transition condition in particular including a zero crossing from the first maximum to the first minimum of the bipolar signal. A (post) oscillation is also covered by bipolar signal. The transition condition corresponds on the time/distance axis to the desired value of the regulation or to the value of the distance to be determined. The filter can be part of the digital component of the evaluation unit; however, it is preferably an analog component since otherwise too many signal portions are already lost beforehand and the precision is impaired. The filter can, for example, be a differentiator or a band pass. It is conceivable to define the transition condition via a different and also more complex characteristic, that is a later zero crossing or a point of inflection. The extremes themselves could be used for this purpose between which the zero crossing is disposed, but whose characteristic is level-dependent and therefore less robust or more characteristics or zero crossings could be used to increase the precision further.

In this respect, the change of position monitoring unit or the evaluation unit is preferably made to determine the noise level as the reference point in advance. For this purpose, averaging can be carried out over all the bins or a selection of the bins in the histogram.

The change of position monitoring unit is preferably made to recognize the received signal with reference to a signature, in particular to an alternating change from maxima to minima and vice versa which each form a falling envelope, in particular a logarithmic envelope. A signature detects the substantial features of a function curve and can thus be evaluated and can be recognized faster despite fluctuations, in contrast to a comparison with the total function curve. This signature can be simple or complex, depending on whether the evaluation time or the precision is the focus. It should be robust against noise, fast to be evaluated and as inimitable as possible. How many of the alternating changes have to be present for this purpose and how precisely the amplitudes of the associated envelope have to be met can accordingly be optimized for the application. The signature can be located several times over the total monitored zone, for example by multiple reflections. The respectively most pronounced signature should therefore determine the fixing of the regulation time interval, which is often the one which starts with the strongest maximum which is found in the monitored zone. The signature should be selected and characterized such that the regulator can find the transition condition.

The change of position monitoring unit is preferably made to store a history of which regulation time interval it would in each case have preset for the regulator at the periodical check to preset that regulation time interval for the regulator which is that of the received signal in accordance with a statistical evaluation of this history. Short or single events are thus initially not taken into account so that a precipitate jump is avoided. Only when a better regulation time interval is found more sustainably is the regulator also offset. In this respect, a specific inertia for the then current regulation time interval is preferred which can be reflected in a higher statistical weighting in the history. The then current regulation time interval should be preferred, in particular when the statistical evaluation cannot decide or can only make a close decision between two or more regulation time intervals, for so long until a clear decision can be made.

The method in accordance with the invention can be designed in a similar manner by further features and shows similar advantages. Such further features are described in an exemplary, but not exclusive manner in the dependent claims subordinate to the independent claims.

Figure 2:
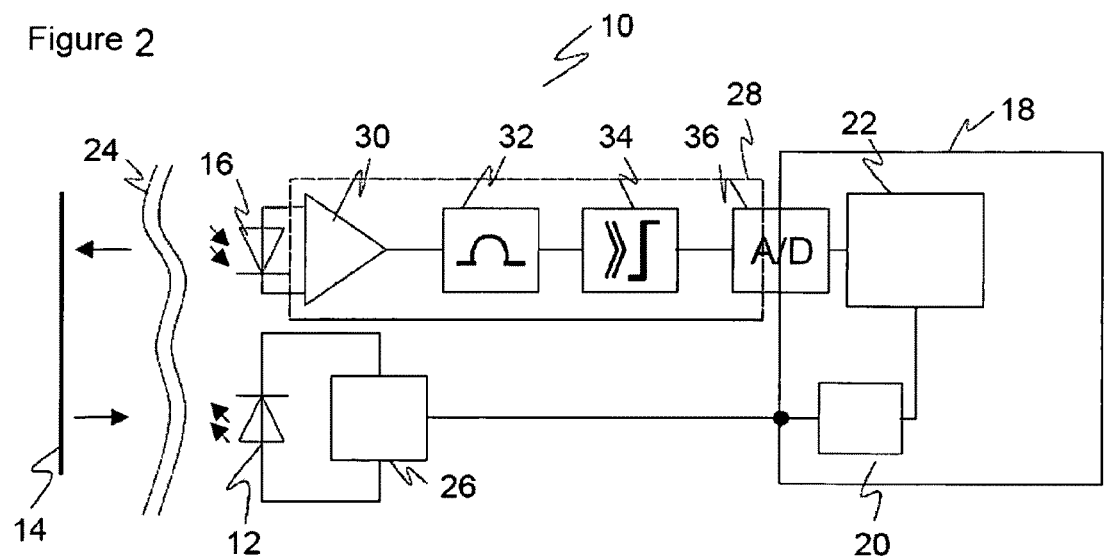
Figure 3:
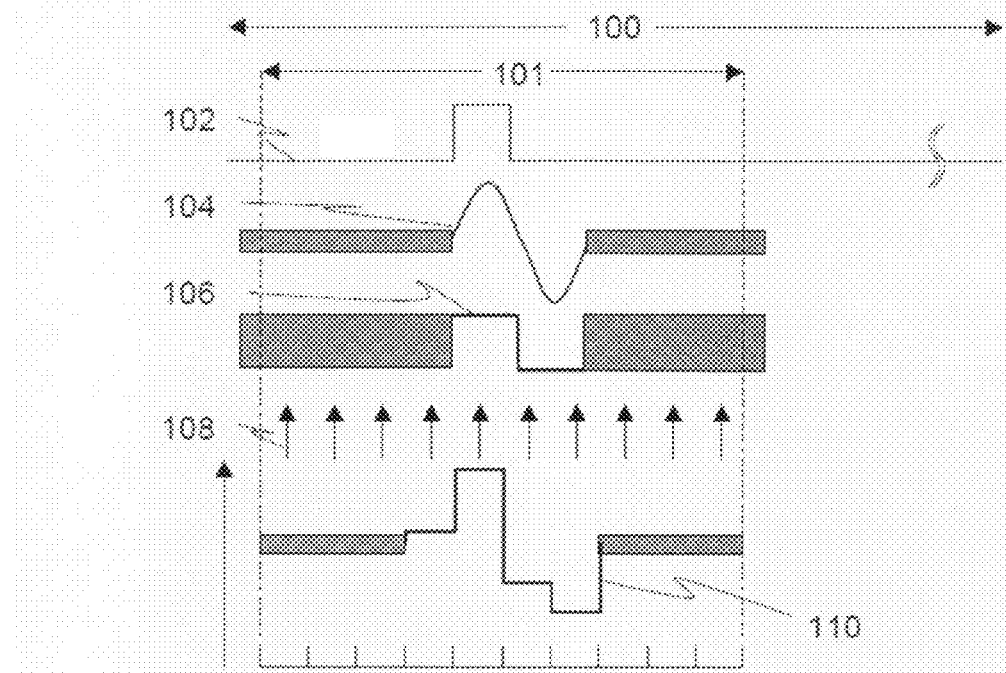
Figure 4:
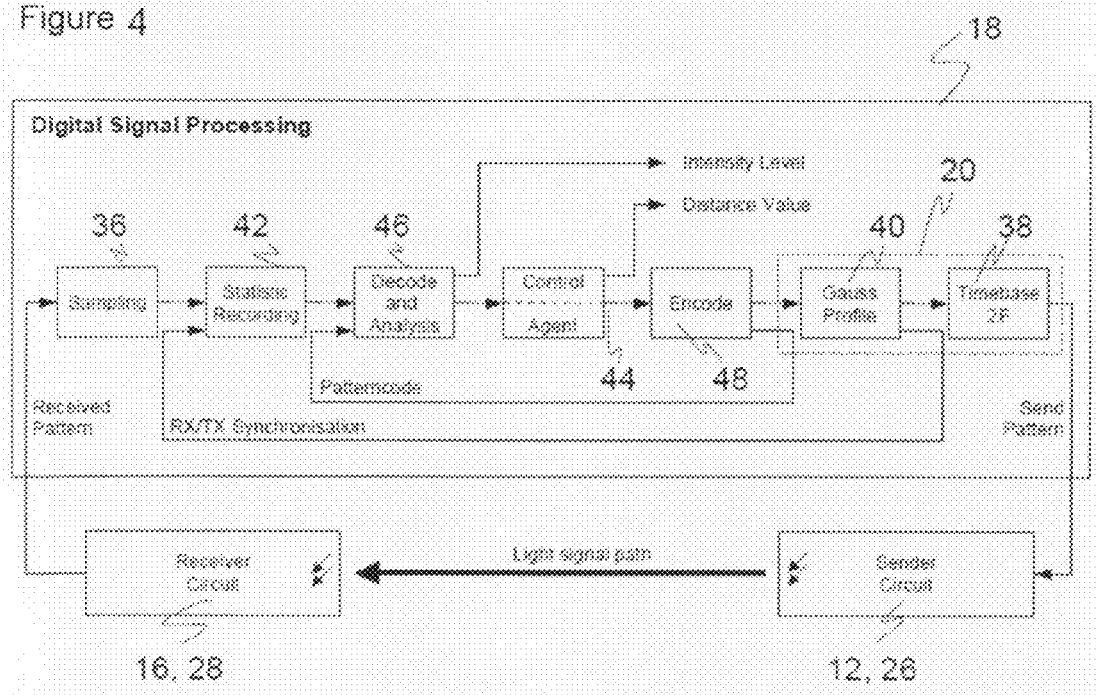
Figure 5:
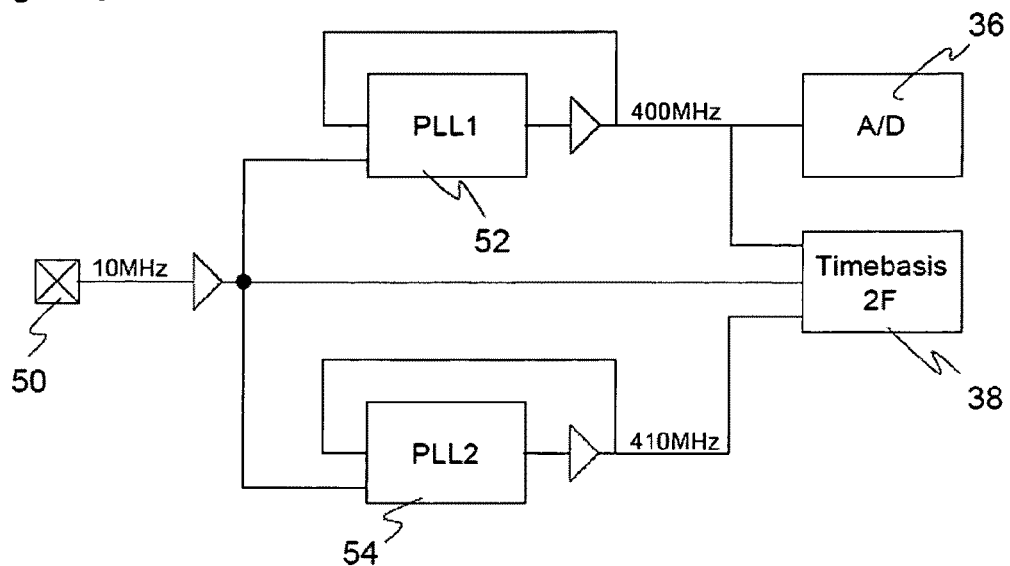
Figure 6:
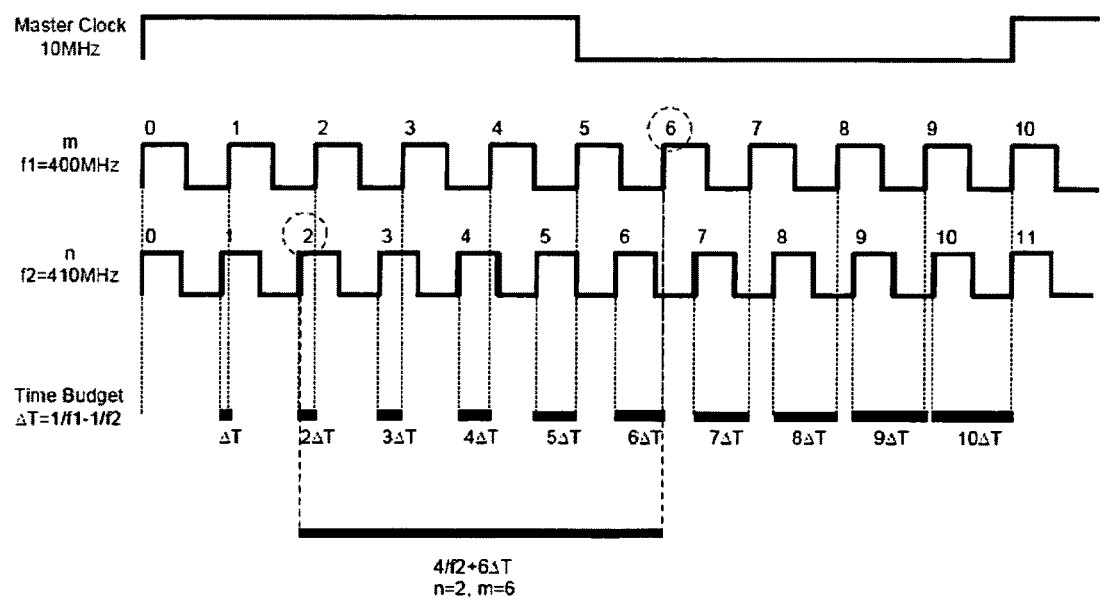
Figure 7:
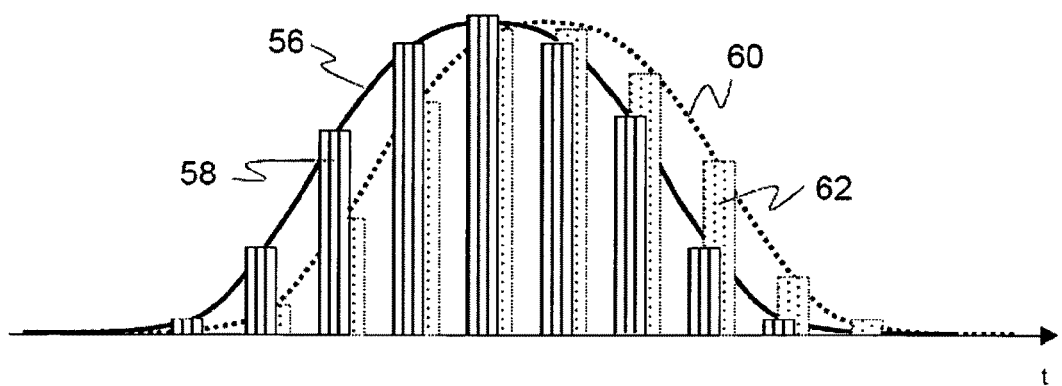
Figure 8:
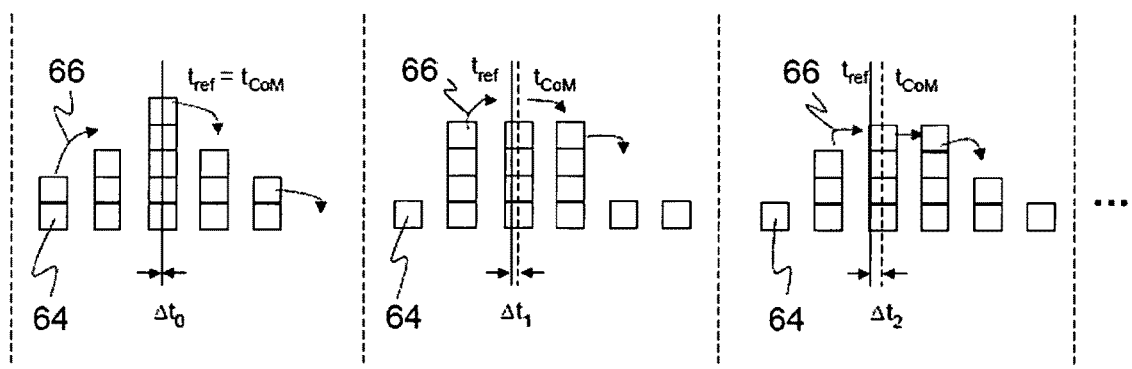
Figure 9:
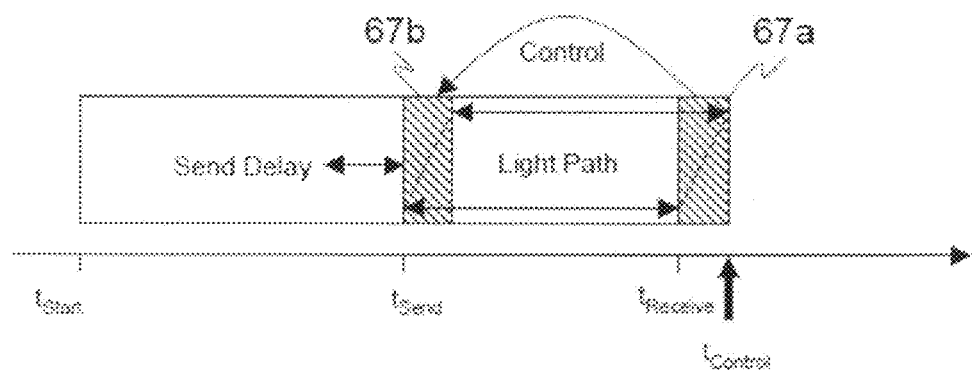
Figure 10:
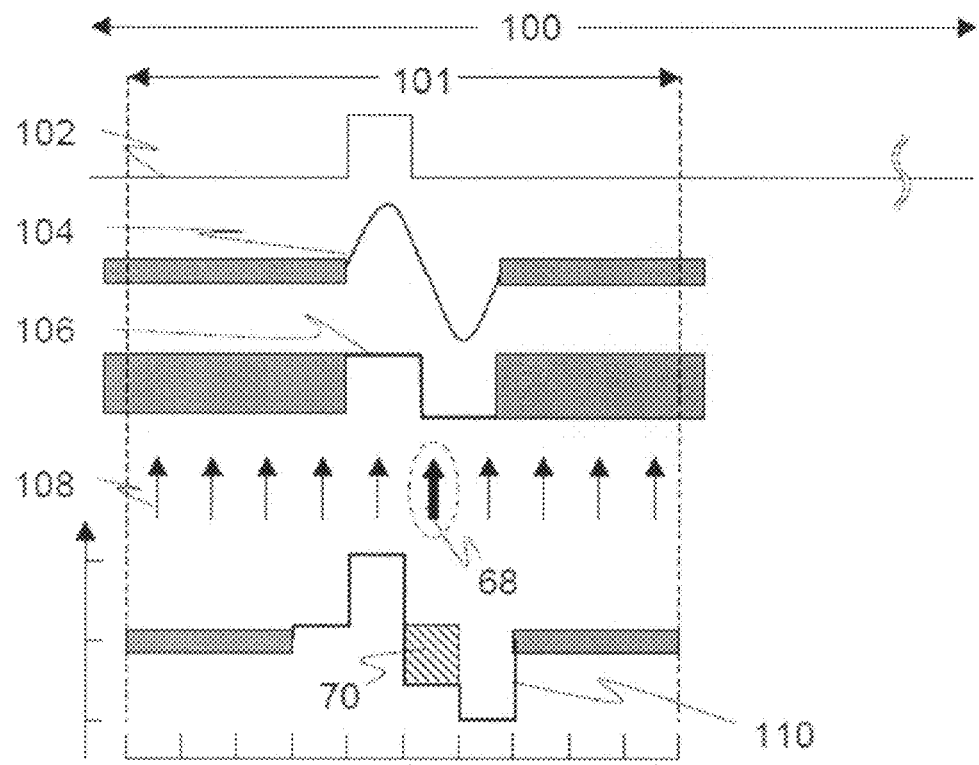
Figure 11:
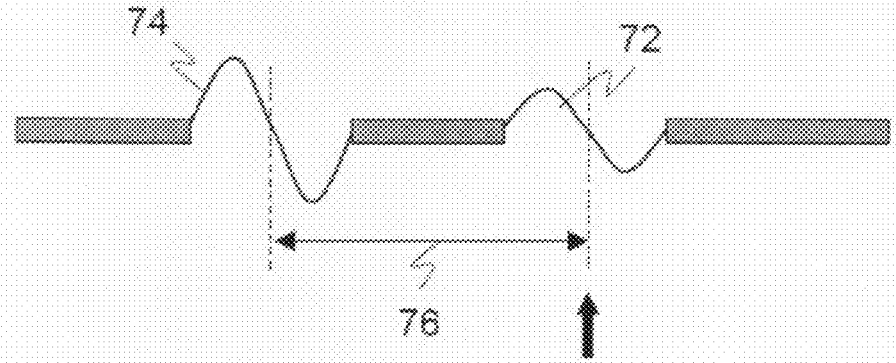
Figure 12:
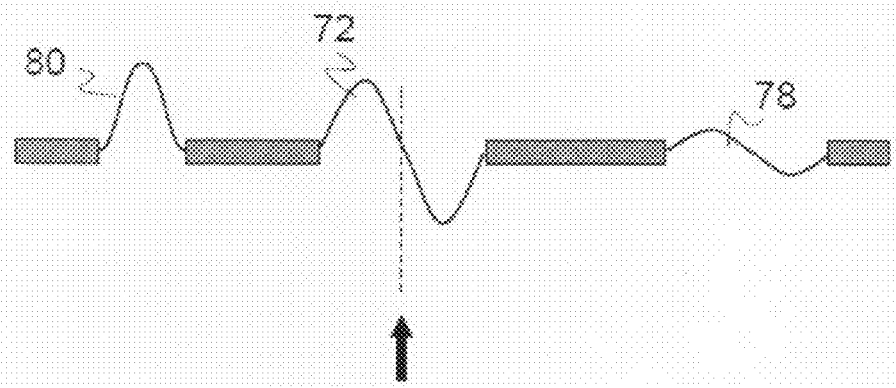
Figure 13:
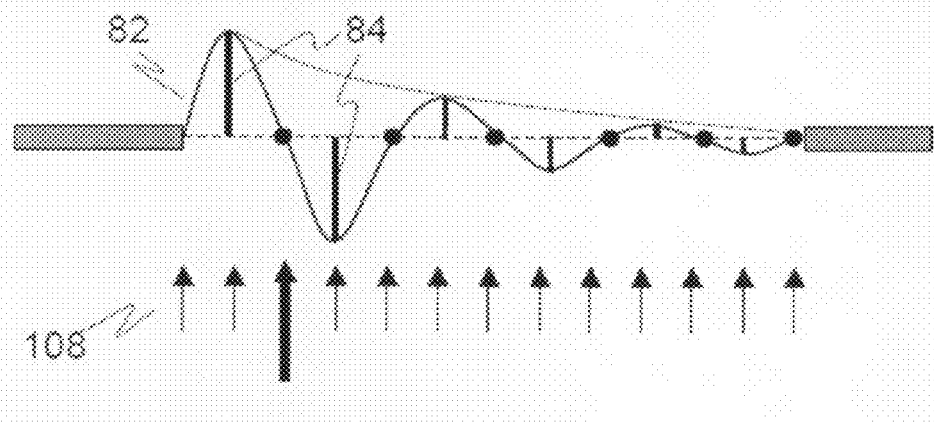
Figure 14:
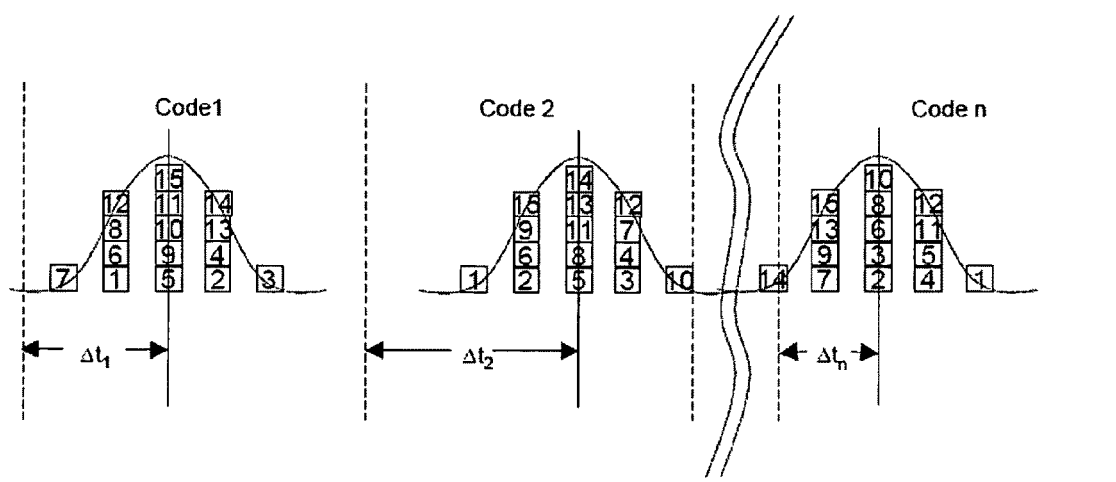

The invention will also be explained in the following with respect to further advantages and features with reference to the enclosed drawing and to embodiments. The Figures of the drawing show in:

FIG. 1 a very simplified schematic block diagram of an optoelectronic distance measurement sensor in accordance with the invention;

FIG. 2 a block diagram of the sensor in accordance with FIG. 1 with a representation of further elements;

FIG. 3 a schematic representation of the signals in different processing stages for the explanation of the evaluation process;

FIG. 4 an overview representation of the individual processing blocks for the digital signal evaluation;

FIG. 5 a block diagram for the generation of a high-resolution time base;

FIG. 6 schematic signal curves for the explanation of the generation of the time base;

FIG. 7 a schematic representation of the transmission patterns to increase the resolution;

FIG. 8 a representation in accordance with FIG. 7 for the explanation of the generation of high-resolution time increments;

FIG. 9 a representation of the time intervals and of the observation time to which the reception of the light signals is regulated;

FIG. 10 a representation analog to FIG. 3 for the further explanation of the regulation in accordance with FIG. 9;

FIG. 11 a schematic representation for the explanation of a higher ranking monitoring agent to the correct regulation time interval in which the observation time is changed;

FIG. 12 a representation in accordance with FIG. 11 with examples for interference signals to which the monitoring agent does not change;

FIG. 13 a representation of a received signal for the explanation of a level measurement; and FIG. 14 a schematic representation of a transmission pattern encoding for the measurement zone extension and/or for the safe association of the transmitted signal to the received signal.

FIG. 1 shows an optoelectronic distance measurement device or sensor 10, which is shown very simplified and which transmits via a light transmitter 12 a light pulse to a reflector or to a reflecting target object 14. The light beam reflected or remitted there returns to a light receiver 16 which surrounds the light transmitter 12. Because the light beam expands on its path, the light transmitter 12 only covers a small and insignificant portion of the reflected light. Alternatively, other known solutions can naturally also be used such as autocollimation with a beam splitter and a common optical system, for instance, or pupil division, where two separate optical systems are provided and the light transmitter and the light receiver are arranged next to one another.

The light transmitter 12 and the light receiver 16 are controlled and evaluated by a control 18. The control 18 causes the light transmitter 12 to transmit individual light pulses at a known time. It will be explained in detail further below how the required transmission time delay is achieved. The control 18 determines the reception time of the light pulse in the light receiver 16 in a manner likewise still to be explained. The light transit time which in turn corresponds via the speed of light to the distance of the target object 14 is calculated from the reception time with the known transmission time.

At least two modes are possible for the sensor 10. In one mode, the light transit time and thus the distance is measured. In another mode, a specific distance is taught, for example with respect to a fixed cooperative target, and monitoring is carried out whether its distance changes.

The sensor 10 can be an optoelectronic sensor or a distance measuring device. In addition to an actual distance measurement, in which an absolute value is determined for a distance to an object 14, the monitoring of a taught distance, for example from a fixed cooperative target 14, for changes of the taught distance is also conceivable. A further embodiment is a reflection light barrier, that is a light barrier having a light transmitter and a reflector arranged opposite, with an interruption of the beam reflected there being detected. Monitoring can be done by the measurement of the distance or of the change of the distance of this reflector whether the reflector is still at the expected position. All the known sensors can output or display a distance value or can also work as a switch in that a switch event is triggered on detection of an object at a specific distance or on a deviation from an expected distance. A plurality of sensors 10 can be combined, for instance to form a distance-measuring or distance-monitoring light grid. Mobile systems are also conceivable in which the sensor 10 is mounted movably or scanning systems in which the transmitted light pulse sweeps over a monitored line or a monitored area with a deflection unit, with the deflection unit being able to be a rotating mirror or a polygonal mirror wheel.

Further details of the sensor 10 are shown in FIG. 2. Here and in the following, the same reference numerals designate the same features. A laser diode 12 is shown as the light transmitter by way of example here. Any desired laser light sources 14 can be used, for example edge emitters or VCELs (vertical cavity surface emitting lasers), and generally other light sources such as LEDs are also suitable provided they can generate signals sufficiently sharp in time. The receiver is accordingly shown as a photodiode 16, with the use of a PDS (position sensitive diode) or of an array or of a matrix of light receiving elements being conceivable such as a CMOS chip, that is generally any receiver which can convert a light signal into an electric signal.

The control is implemented in the described embodiment in accordance with the invention on an FPGA (field programmable gate array) 18. Alternative digital components were already named non-exclusively in the introduction. The control 18 has a transmission time setting device 20 and an actual evaluation unit 22. The terminals of the FPGA 18 are made differently to be able to transmit the signals more free of interference signals. The target object 14 is usually further away in the scale of FIG. 2, as is indicated by dashed lines 24.

The sensor 10 has a transmission path to which, in addition to the actual light transmitter 16, a laser driver 26 and the delay device 20 belongs, and a reception path to which the photodiode 12 which supplies the digitized received signal to the evaluation unit 22 via an analog preprocessor 28.

The analog preprocessor 28 forms a multi-stage processing path. This starts with an amplifier 30, for instance a transimpedance amplifier which accepts and amplifies the signal of the photodiode. A downstream filter 32, which can be a band pass filter or a differentiator, for example, converts the unipolar light signal into a bipolar signal. A limiting amplifier 34 is provided as the next preprocessing stage which amplifies the amplitude so much and subsequently cuts it so that the light pulse signal is driven to a rectangular pulse driven into saturation. This signal is supplied as the last preprocessing stage to an A/D converter 36, in particular to a binarizer, which does not convert the amplitude into a digital numeric value, but only into a binary value. The A/D converter 36 is preferably not a separate component, but is rather realized via the inputs of the FPGA 18 with simple analog R networks or RC networks connected upstream.

The signal and evaluation path in the sensor 10 through the components just described will now be described with the help of FIG. 3. In this respect, a statistical evaluation of a plurality of individual measurements is preferably provided because the signals of the individual measurement have much too much noise to be able to determine reliable reception times.

The light transmitter 16 in each case generates a light pulse in each measurement period 100 which enables the determination of a precise time. As explained further below, the control 18 distinguishes a regulation time interval 101 which only includes a part of the measurement period and corresponds, for example, to a meter of measurement path. A rectangular pulse is suitable as the light signal, but other pulses, such as Gaussian pulses, multimodal signals, for the encoded association of each signal, for example, and also stages are conceivable. All these signal forms will only be called a light pulse in the following.

The light pulse is reflected or remitted at the target object 14 in the monitored zone of the sensor 10 and is then converted into an electrical signal in the light receiver 12. The electrical signal is subsequently amplified in the amplifier 30. The amplified electrical signal 102 which arises is shown in idealized form; under realistic conditions, the received light pulse 102 would not show a precise rectangle, but would only show transients at the flanks and noise overall.

The amplified electrically received light pulse is a unipolar signal due to the nature of the light. It is converted to a bipolar signal 104 in the filter 32. This can be realized with a band pass filter, but the generated signal curve 104 corresponds at least approximately to the extended derivation of the amplified signal 102. In FIG. 2, gray rectangles are shown, beside the bipolar signal 104, which are intended to symbolize the noise level. The noise level can surpass the amplitude of the amplified signal 102 in practice. Furthermore, only a sine oscillation of the bipolar signal 104 is shown. Post-oscillations, that is further sinus periods with increasingly damped amplitude, are omitted for a simplified representation. A pure sine is naturally also not always to be expected, but a curve with a maximum and a minimum.

The bipolar signal 104 is amplified so much and cut-off in the limiting amplifier 34 such that the actual signal becomes a rectangle flank 106 and the noise level shown by the gray rectangles is extended over the total dynamic range in its amplitude.

The rectangle flank 106 is sampled with a sampling rate of, for example, 2.5 ns in the binarizer 36. This sampling rate is symbolized by arrows 108 in FIG. 3. The bit sequence which arises, 1 bit per 2.5 ns with the numerical values given, is used in the evaluation unit 22 to form a histogram 110. An accumulator is provided for each bin for this purpose and is only counted up with an associated bit value "1". The sampling is, contrary to what is shown, not necessarily limited to the regulation time interval 101.

With ideal signals without noise, only that bin would be filled in this histogram 110 which is disposed above the right hand flank 106. The noise level raised by the limiting amplifier 34, however, also fills the remaining bins, and indeed approximately in every second measurement period 100 due to the randomness of the noise in the expected value.

If the process just described is iterated and if the histogram 108 is formed over k measurement periods 100, the bins are filled approximately with the value k/2 by the noise, with statistical fluctuations being added. This value k/2 corresponds to the signal value zero due to the binarization. The maximum formed by the positive part of the bipolar signal 104 rises upwardly from this and the corresponding minimum downwardly. Together with the post-oscillations, not shown, the histogram shows a characteristic curve in the time interval of the received signal whose signature is used by the evaluation unit 22 to determine the reception time. The statistical evaluation of a plurality of individual measurements also allows this when the individual measurement does not permit any reliable distance determination in a measurement period 100 due to noise portions which are too high.

Due to the limited sampling rate, which is given by way of example at 2.5 ns, it is not sufficient to search directly for the received signal in the histogram 110 since the time resolution would be too low. FIG. 4 shows an overview representation of the procedure in accordance with the invention to improve the time resolution far beyond the precision of a time pattern preset, for instance, by an FPGA or an A/D converter. In this respect, a plurality of mutually engaging steps are shown in the overview of FIG. 4. The best total performance is achieved in this combination. It is, however, not absolutely necessary to implement all of the steps simultaneously. A partial selection also already increases the measurement precision with respect to conventional systems. The individual steps in accordance with the overview in FIG. 4 will subsequently be explained in more detail with further Figures.

The transmission time setting device 20 has a time base unit 38 which provides a high resolution time base using a process based on two frequencies. The time base can be utilized to delay the transmission of light pulses with much more precision than with multiples of 2.5 ns, for example with multiples of 60.975 ps.

The transmission time setting device 20 furthermore has a unit 40 for the fine setting of a transmission time in which a transmission pattern, for example a Gaussian transmission pattern, is formed by means of a plurality of individual measurements to refine, theoretically as desired, an effectively acting transmission time delay by the center of mass of the associated reception pattern with respect to the possible physical transmission times. The time base unit 38 therefore directly changes the resolution which is further refined indirectly by the unit 40 for the fine setting of a transmission time via a statistical center of mass shift.

The light pulses conducted over the measurement path on such a highly resolved time pattern are received and are digitized in the A/D converter. Subsequently, the histogram evaluation explained with respect to FIG. 3 takes place in a histogram unit 42.

The actual distance determination takes place in a regulator/agent 44 and is not based on a direct sampling, but rather on a technical regulation adjustment principle to use the generated time resolution effectively. The regulation parameters have to be dimensioned in this respect, on the one hand, such that required stability criteria are satisfied and the sensor 10 remains robust with respect to interference influences, for example by further reflections or EMC. On the other hand, however, this has the consequence of too low an agility of a classical regulator which could no longer react threshold-free to a real target change. The invention therefore provides monitoring the regulator constantly by means of an agent in the background. The agent regularly evaluates the total working region of the sensor 10 and controls the regulator to the correct regulation time interval 101, that is the time range of the target position, on a change of target.

The histograms 110 for a high resolution level measurement can be evaluated in a level determination unit 46. Customarily used additional analog elements can thus be dispensed with. Furthermore, the level determination is very precise, especially in combination with the regulation principle. The level can be output, but also be used for a correction of the distance measurement.

The transmitted pulses can be output in encoded form on the time axis in an encoding unit 48 to enable an unambiguous association of transmitted pulse to received pulse. They are then decoded in a decoding unit 46 which was combined with the level determination unit in FIG. 4 for simplification. It can, for example, be achieved using a transmission pattern encoding to suppress received pulses from the background, that is those which are received outside the measurement zone after the end of the actually associated measurement period 100. Light pulses from systems of the same construction represent another possibility of confusion which is prevented by encoding. In this respect, the Gaussian transmission pattern is not transmitted and received in a natural order, but rather in a randomized order. The decoding unit 46 knows the randomization key and can thus perform reverse encoding. A plurality of code signatures can thus be underway simultaneously on the light signal path because the different path sections are characterized by the encoding and are thus unambiguous.

The process will now be explained with reference to FIGS. 5 and 6 with which the time base unit 30 provides time increments independently of the sampling rate of 2.5 ns, for example in a time pattern of 60.975 ps.

A split clock is generated from a master clock 50 of 10 MHz as a multiple of the master clock 50 of f1=400 MHz or f2=410 MHz in a first PLL 52 (phase-locked loop) and a second PLL 54. The time base unit 38 receives the two frequencies of the PLLs 52, 54 and the master clock 50 itself for the synchronization. The frequencies are connected in the time base unit 38 such that their phase deviation can be used for the reproducible generation of time increments. The frequency of 400 MHz of the first PLL 52 simultaneously serves as a sampling rate for the A/D converter 36.

As can be seen in FIG. 6, the periods of the two different frequencies 400 MHz and 410 MHz increasingly run apart and meet again after a period of the master clock 50 of 100 ns. At this time, synchronization in each case takes place to the theoretically simultaneously rising or falling flank so that any running apart of the PLLs 52, 54 and of the master clock 50 is compensated. FIG. 6 is simplified and only shows 10 or 11 periods instead of the actually required 40 or 41 periods.

The PLLs 52, 54 are preferably provided by the FPGA 18. The two frequencies can, however, also be generated differently than by means of PLLs. A master frequency deviating from 10 MHz and different frequencies than the exemplary frequencies f1=400 MHz and f2=410 MHz are naturally also covered by the invention, with the choice having to find a balance between the stability of the derived frequency generated and a difference period which is as short as possible. Time patterns in the range of picoseconds and below can be achieved at least in principle by this choice.

The periods of the derived frequencies f1 and f2 are counted through in shift registers triggered by these frequencies so that the time base unit 38 as shown in FIG. 6 knows which period a flank belongs to. An increasing phase difference forms between the respective ith period of f1 and f2 and is just so large after a full period of the master clock 50 that the 41st period of f2 comes to lie simultaneously with the 40th period of f1. These differences are available in the form of time increments or time budges as multiples of the difference period $\Delta T=1/f1-1/f2=60.975$ ps. In this respect, reference is again made to the numbers 10 and 11 of FIG. 6 which differ for the simplified representation.

The time base unit 38 now selects a respective pair from the nth period of the frequency f2 and the mth period of the frequency f1 to generate any desired multiples of the difference period. Each pair has a fixed position relative to the master clock 50. For example, n=2 and m=6 corresponds to a time interval of $4/f2+6\Delta T$, where $1/f2=41\Delta T$. Full periods of the master clock will be added in this respect to fill the measurement period 100 of 1 μs, for example by a higher ranking control unit which masks the timing and is fixed to the master clock. In this respect, the counters are reset after 100 ns with each synchronization so that the numbering of the pairs starts again. Provided that the periods of f1 and f2 are counted beyond the synchronization time after 100 ns, the pairs can alternatively also directly fix time intervals longer than 100 ns. To be able to decouple the pairs in a defined manner, the two derived frequencies f1 and f2 should have a rigid coupling to the master clock as is given by PLLs.

Due to the two derived frequencies f1 and f2, a time base is thus available which is substantially finer than the sampling pattern. Either the actual transmission time can thus be delayed with respect to a reference time by multiples of the difference period or the one element of the pair defines the transmission time and the other the time for the start of the statistical recording of the received pattern in the histogram unit 42. There is thus a time offset between the transmission time and the reception time which is independent of the sampling pattern with the slow 2.5 ns. The time base unit 38 can work completely within the FPGA 18 and can therefore be implemented simply and is less prone to interference.

The time increment available by the time base unit 38 is furthermore discrete and is determined by the selection of the frequencies. The precision of an individual measurement within a measurement period 100 is therefore initially limited by the difference period of the selected frequencies.

FIGS. 7 and 8 illustrate a method for the time resolution increase for a plurality of individual measurements by means of the unit 40 for the fine setting of a transmission time. In this respect, the transmission time is varied with reference to a distribution in the repetitions in further measurement periods 100. In accordance with an envelope 56, the associated occurrences are preset at the discrete sampling points 58 which are fixed by the physically possible discrete transmission times. The center of mass of this distribution determines the effectively active transmission time which is decisive for the total statistical evaluation for the histogram 110 after k measurement periods 100.

This center of mass is now, however, not bound to the discrete physical transmission times or sampling points 58 themselves. By selection of a different distribution 60, that is of different occurrences 62 at the same discrete sampling points, the effectively active transmission time can be selected with a precision which can be increased theoretically as desired also between the discrete sampling points 58. In FIG. 7, the sampling points 58 of the one distribution shown striped are shown slightly offset with respect to the sampling points 62 of the other distribution 60 shown dotted. This serves only for illustration since the sampling points are respectively bound to the same discrete physically possible transmission times. The sampling point grid can be understood as possible offsets with respect to a reference time and thus the occurrences can be understood as an offset distribution.

FIG. 8 illustrates how fine time increments can be defined in this manner. The starting position for a time increment $\Delta t_0=0$ is shown in the left hand third of FIG. 8 at which the individual measurements shown as blocks 64 form a distribution whose center of mass time $t_{CoM}$ just coincides with the reference time $t_{ref}$. In precise terms, it is not necessary already to work with a distribution at all here since the center of mass time $t_{CoM}$ would also be achievable directly via the discrete time pattern.

A distribution is now chosen for the next time increment whose center of mass is shifted a little as is shown in the middle third and in the right hand third of FIG. 8. For this purpose, some individual measurements are carried out with different offsets. For example, three individual measurements are shifted to the right in each case as indicated with arrows 66. It is naturally conceivable to select a different number than three, with only one shifted individual measurement fixing the lowest possible time increment. If the number is varied from step to step, the arising time grid is irregular.

Analogously, a plurality of distributions can be set forth at which the respective center of mass time $t_{CoM}$ is increasingly shifted by $\Delta t_1, \Delta t_2, \ldots$ with respect to the reference tine $t_{ref}$. The discrete time pattern of the sampling points is thus refined by the distributions and associated center of mass times $t_{CoM}$ with a table of such distributions which fills the interval between two sampling points. The unit 40 for the fine setting of a transmission time can make use of this table to output a transmission pattern with a desired time increment and thus to achieve a desired or effectively active transmission time independently of the discrete sampling points.

The distribution which is fixed by the envelope 56, 60 should have more mass in the proximity of the center of mass. Unimodal distributions, for example triangles, parabolas or a Gauss curve are therefore preferred which also each have a small standard deviation so that the measurement base does not become too wide. A few sampling points are already sufficient for this purpose. On the other hand, the flank should not drop too steeply, so that a Gaussian profile is preferred.

A certain noise in the system even benefits the process in this respect since then the sampling points are quasi smeared into one another and form a smoother approximation to the envelope 56, 60. A completely noise-free system would obtain artifacts of the discrete sampling points in the reception pattern. Since generally interference approximately results in Gaussian noise, a Gaussian distribution is again preferred for the envelope 56, 60.

The achievable increase in resolution ultimately depends only on the number of individual measurements k which flow into the formation of the histogram 110. Each additional measurement creates further possibilities to define additional time increments, as illustrated in FIG. 8. With some hundred repetitions, for example, the response time up to the availability of a distance measurement value is still at some hundred measurement periods 100, that is at some hundred μs with the numerical values of FIG. 3. An increase in resolution by approximately two orders of magnitude can thus already be achieved. If the discrete time pattern of the sampling points is fixed by the time base unit 38 at, for example, 60.975 ps, a sub-picosecond resolution is thus made possible.

Despite the two previously introduced possibilities for the refining of the discrete time pattern, the resolution of the histogram 110 is still limited per se by the sampling rate of the A/D converter 36. In order now to fully profit from the increase in resolution, in accordance with the invention, no attempt is made to determine the reception time with high precision, but it is rather fixed in advance as an observation time and subsequently a transmission time delay is adjusted for so long until the reception time coincides with this observation time.

FIGS. 9 and 10 illustrate this regulation. The observation time $t_{Control}$ is selected in advance at a point of the sampling grid somewhere within the measurement period 100 such that it is behind the maximum light transit time to be measured, for example at the center of the measurement period 100 at 0.5 µs or approximately 75 meters. The light pulse is delayed by a transmission time delay with the help of the time base unit 38 and/or the unit 40 for the fine setting of a transmission time with respect to a common time reference $t_{Start}$ before the transmitted pulse is actually transmitted at a time $t_{Send}$. After the light transit time which is the actual measurement parameter, the light pulse is received again at a time $t_{Receive}$. It is the object of the regulation to correct the transmission time delay in a feedback loop such that $t_{Receive}$ always coincides with $t_{Control}$ as is shown by regrouping of the hatched blocks 67a, b.

The light transit time can then be calculated by simple subtraction. The time interval $t_{Control} - t_{Start}$ is a known constant selected in advance which differs in the steady state condition precisely by the transmission time delay from the light transit time. Further constant portions, for instance signal transit times in the electronics, can be eliminated by calibration or taken into account in the calculation. A temperature compensation is also possibly required for these portions.

The regulator must be able to recognize with high precision for the feedback whether the reception time $t_{Receive}$ coincides with the observation time $t_{Control}$. FIG. 10, which coincides in large parts with FIG. 3, illustrates this. The observation time is marked by a bold arrow. The zero crossing from the first maximum to the first minimum of the received signal recorded as the histogram 110 is monitored as the transition condition which fixes the reception time. Other characteristics can naturally also be evaluated, but the first zero crossing is the most pronounced and is largely independent of the level in contrast to the extremes themselves.

The hatched rectangle 70 of FIG. 10 indicates the deviation in accordance with the hatched rectangles 67a, 67b of FIG. 9 from the ideal transition position. This is therefore a measure for the control deviation and the basis for the calculation of the required adaptation of the transmission time delay. If the signal transition $t_{Receive}$ is disposed in the observation time $t_{Control}$, this control deviation can be corrected to zero at least in the ideal system by adjusting the transmission time delay.

The regulation is implemented digitally in the FPGA and thus has access to the histogram 110. The regulation process per se can include any known variant, for example Kalman-based regulation, or the regulator is a PI regulator or a PID regulator.

The regulator preferably does not work over the total measurement period 100, but rather only within a regulation time interval 101, and it is favorable for the avoidance of erroneous regulations if it is small enough not to include a plurality of potential targets 14. If the signal transition $t_{Receive}$ is not within this regulation time interval 101, the regulator cannot determine the regulation deviation 70. A higher ranking agent is therefore provided which in each case searches the histogram 110 for potential targets 14 over the total measurement zone. The agent is either a separate process or is at least conceptionally separate from the regulation which then periodically calls it up and is thus higher ranking than the regulation. Even if the regulation time interval 101 is selected as wide as the measurement period 100, the regulator itself cannot easily recognize a target change since there is the risk that it would converge at local extremes and would not exit them independently.

The agent preferably does not recognize the received signal with reference to a complete pattern comparison since this would be too noise-sensitive. Instead, it searches for a signature which can be given, for example, by the alternating regular transition from the positive to negative maximum amplitude and vice versa. The signature can correspond to higher demands the more such changes of sign are monitored and it is conceivable to demand further criteria such as the observation of the logarithmic fall of the absolute values. These exemplary signatures apply to a simple oscillation with a positive and a negative signal portion which arise from a simple transmitted pulse. More complex transmission signals are conceivable to harden the system with respect to external interference or systems of the same construction and the signature is then also to be selected in correspondingly adapted form.

FIG. 11 shows an example for a target change. The regulation time interval 101 is initially selected around a signal 72 and the regulator has corrected the observation time to its first zero crossing. The higher ranking agent has, however, located a more pronounced signal 74 in the meantime. To carry out the target change, the agent calculates a time difference 76 and sets the regulator to the new signal 74 in that the regulation time interval 101 is shifted, that is the transmission time delay is adapted by the time difference 76. In this respect, the agent in no way has to calculated the precise time difference 76 as shown in FIG. 11, but it is rather sufficient if the regulation time interval 101 is selected roughly around the signal 74 so that the regulator can adjust to the exact new reception time.

A plurality of conditions have to be satisfied for such a change of position or target. A check is initially made where signals with the demanded signature are then currently located. In this respect, even simple threshold evaluations can prefilter. The noise level, which is at k/2 in the ideal case, is taken into account by mean value formation over the histogram 110 or partial regions thereof. The maximum amplitudes of such located potential targets are subsequently compared. If a potential target with a larger amplitude is located outside the then current regulation time interval, this potential target represents the actual then current target 14 from the point of view of the agent. However, so that singular events or misinterpretations of the agent do not result in unnecessary jumps, the agent records a history of the potential targets with a defined decay time, for example in a queue. Only when a new target accumulates statistically significantly in this history does the agent actually carry out a target change, for example if a specific target were selected in 5 of 8 cases within the history. In this manner, the system can change to a new position without threshold, thus allows measurements up to very low signal levels and is nevertheless robust with respect to interference.

FIG. 12 shows two cases of potential targets which do not satisfy at least one of the named criteria and which therefore also do not trigger any target change. In addition to the signal 72 of the then current target 14, a respective further potential target is given by signals 78 and 80. The signal 78 also satisfies the signature, but has a smaller amplitude and is therefore not selected. In this respect, the amplitude can still be distance-corrected. The signal 80 already does not satisfy the signature and is therefore directly recognized as interference.

The received signal 104 or the histogram 110 also contains level information on the area below the signal in addition to the distance information over the time position. On a linear observation, the level is proportional to the quantity area below the oscillation. A level measurement value is therefore available in a simple manner via a further evaluation. FIG. 13 shows the course of a received signal 82 together with the post-oscillations which are omitted in the other Figures for simplification and with which the received signal 82 logarithmically decays. As in numerous other cases, a bold arrow within the sampling pattern 108 indicates the observation time to which the first zero crossing of the received signal 82 is regulated. The summed signal amplitudes 84 of the received signal at sampling points 108 are a measure for the level.

Since the position of the received signal 82 is corrected such that the zero crossing is above a sampling point and the light pulse furthermore has precisely a length of 5 ns, that is a multiple of the sampling rate, the further zero crossings are also just above sampling points. This fixing of the histogram 108 has the result that good level information can be derived despite the low sampling rate. The zero crossings themselves then namely do not contribute anything and, since the extremes are central in each case and thus also on a sampling point, only particularly significant amplitude information flows into the level measurement.

If the received pulse 102 is shaped in the analog preprocessing 28 such that it shows a weakly resonant behavior and if furthermore a limiting amplifier 34 is connected downstream of the filter 32, the dynamic range of a level measurement considerably increases.

The level measurement is not only a possible output parameter, but the level information can rather also be utilized for the correction of a level-dependent distance deviation. This effect, known under the name black-and-white shift, has the result that the determined reception time shows a dependency on the intensity. If this dependency is taught at the start or if it is taken into account in a correction calculation, the determined distance can be compensated and can be made independent of the level over a wide intensity range.

The level information can furthermore also be used for the adjustment of the optical components of the system. A contamination or maladjustment is thus recognized, for example, or the power of the light transmitter 12 can be adapted.

It is conceivable that the sensor 10 accumulates interference signals in the histogram 110 which then result in incorrect measurements. For this purpose, particularly received signals with respect to separate transmitted pulses can be considered which are reflected beyond the measurement zone or also systems of the same construction whose light pulses are received. It is therefore desired to be able to associate received signals with a specific self-transmitted transmission pattern. The encoder 46 and the decoder 48 serve for this purpose which generate additional compensatable shifts on the time axis and resolve them again. Such time shifts also have the effect that interferers constant in time are smeared by the averaging because they lose the fixed time reference due to the time encoding and are each recorded in a different bin.

In particular two kinds of time encoding can be considered which are illustrated in FIG. 14. The center of mass position $\Delta t_1 \ldots \Delta t_n$ is shifted in each measurement period 100, on the one hand. Only the actual received measurement signal follows this random and fast shift of the center of mass position so that interferers can be distinguished or averaged out directly.

For a measurement zone extension or for systematic interference, for instance due to multiple reflections or a system of the same construction, the center of mass shift is not necessarily sufficient. For this reason, alternatively or accumulatively, the order can be varied with which the Gaussian profile is generated in the unit 40 for the fine setting of a transmission time. This order is of no interest for the generation of the histogram 110 since only accumulation takes place. This degree of freedom is used to select a different order with every code 1 ... n as is shown by way of example in FIG. 14 with the numbered transmitted pulses 86. It is thereby in particular possible to expand the measurement zone to multiples of the measurement period 100 since is it clear via the encoding which partial zone a received transmission pattern belongs to.

The time variations can be randomized or deterministic. Randomization has the advantage of providing differences to systems of the same construction. The decoder 46 naturally also has to receive the offset information with randomized shifts in order to be able to compensate it.

The individual elements of the overview FIG. 4 are thus explained in detail. Although the sensor 10 was described in its totality in this manner, individual feature groups can also be utilized sensibly independently of one another. For example, the Gaussian transmission pattern thus further refines the actual transmission times generated by the two frequencies. Both steps, however, also already achieve an increase in resolution per se. Accordingly, these and other feature groups can also be differently combined, in particular over several Figures, than described in the specific embodiments.

The invention claimed is:

1. An optoelectronic sensor (10) for the measurement of distances or distance changes in accordance with the light transit time principle having a light transmitter (12) for the transmission of a light signal and having a light receiver (16) for the reception of the remitted or reflected light signal, wherein an evaluation unit (18) is provided which is made to fix the transmission time for the light signal relative to a reference time and to digitize the received light signal on a sampling pattern (108) having a sampling period to determine the reception time of the light signal, and wherein a time base unit (38) is provided by means of which the transmission time can be shifted relative to the sampling pattern (108) with a time precision below the sampling period, providing a time pattern with a time precision finer than the sampling pattern, wherein the time base unit (38) is made to derive the time shift of the transmission time from a first time signal having a first frequency (f1) and a second time signal having a second frequency (f2) different from the first frequency (f1) and to provide any desired time shifts with a time resolution given by the difference period belonging to the first and second frequencies (f1, f2) wherein the time base unit (38) selects and decouples a pair of nth period of the first frequency and nth period of the second frequency.

2. A sensor (10) in accordance with claim 1, wherein the time base unit (38) is made to derive the first frequency (f1) and the second frequency (f2) from a master clock (50) which also determines the reference time and to synchronize the first frequency (f1) and the second frequency (f1) to the master clock (50) regularly.

3. A sensor (10) in accordance with claim 2, wherein the time base unit (38) has a first PLL (52) having a first divider of the master clock (50) for the first frequency (f1) and a second PLL (54) having a second divider of the master clock (50) for the second frequency (f2), and with in particular the first divider and the second divider being selected such that a difference period which is as small as possible arises in the range of some hundreds or some tens of picoseconds or a few picoseconds.

4. A sensor (10) in accordance with claim 1, wherein the evaluation unit (18) and/or the time base unit (38) is implemented on a digital logic component, in particular on an FPGA, PLD, DSP or ASIC.

5. A sensor (10) in accordance with claim 1, wherein the time base unit (38) has a first counter and a second counter to count the complete periods of the first or second frequencies (f1, f2), with the counters in particular having triggered shift registers and with the time base unit (38) being made to generate the time shift as a time interval between the nth period of the first frequency (f1) and the mth period of the second frequency (f2).

6. A sensor (10) in accordance with claim 1, wherein the time base unit (38) is made to extend the time shift by periods of the first frequency (f1), of the second frequency (f2) or of the master clock (50).

7. A sensor (10) in accordance with claim 1, wherein the evaluation unit (18) is made to trigger the transmission of a light signal at a transmission time in a respective measurement period (100) and to sample the received light signal and to accumulate a histogram (110) of such received light signals over a plurality of measurement periods (100) to determine the reception time from the histogram and the light transit time from it.

8. A sensor (10) in accordance with claim 1, wherein a unit (40) for the fine setting of a transmission time is provided which is made to shift the respective transmission time within the measurement periods (100) by an offset; and wherein the offsets form a distribution (56, 60) whose center of mass forms a desired transmission time and which can be selected with a time resolution which is better than both the sampling period and the difference period, in particular with a time resolution of fewer than ten picoseconds or even less than one picosecond.

9. A sensor (10) in accordance with claim 8, wherein the distribution of the offsets is unimodal, is in particular preset in accordance with a triangular, parabolic or Gaussian function, and wherein a memory is provided in which a table for the unit (40) for the fine setting of a transmission time is stored which holds an associated offset distribution for a plurality of time increments, in particular one respective offset distribution for time increments distributed evenly over a sampling period and/or over the time interval between two discrete times.

10. A sensor (10) in accordance with claim 1, wherein the evaluation unit (18) is made to check with reference to a transition condition of the received light signal whether the light signal is received at an observation time; and wherein a regulator (44) is provided which is made to adjust the transmission time or the desired transmission time by means of an additional transmission delay time such that the transition condition is satisfied at the observation time.

11. A sensor (10) in accordance with claim 10, wherein a regulation time interval (101) within which the regulator (44) can check the transition condition and can adjust the transmission delay corresponding to a partial region of a measurement zone of the sensor (10); and wherein a change of position monitoring unit (44) is provided to check periodically the time at which the received signal is received and, if this time is outside the regulation time interval (101), to preset a new regulation time interval (101) for the regulator (44); wherein the change of position monitoring unit (44) has an agent, that is a process active constantly or at regular allocated time slots and independent of the regulator (44); and wherein the agent (44) has the goal of locating a regulation time interval (101) and of presetting it for the regulator (44) in which the light signal is received.

12. A method for the measurement of distances or distance changes in accordance with the light transit time principle in which a light signal is transmitted and the remitted or reflected light signal is received, the transmission time for the light signal is fixed relative to a reference time and the received light signal is digitized to a sampling pattern (108) having a sampling period to determine the reception time of the light signal, and wherein the transmission time relative to the scanning pattern (108) is determined by means of a time base unit (38) with a time precision below the scanning period, providing a time pattern with a time precision finer than the sampling pattern, wherein the time base unit (38) is made to derive the time shift of the transmission time from a first time signal having a first frequency (f1) and a second time signal having a second frequency (f2) different from the first frequency (f1) and to provide any desired time shifts with a time resolution given by the difference period belonging to the first and second frequencies (f1, f2), wherein the time base unit (38) selects and decouples a pair of mth period of the first frequency and nth period of the second frequency.

13. A method in accordance with claim 12, wherein the first frequency (f1) and the second frequency (f2) is derived with a first divider and a second divider from a master clock (50) which also determines the reference time, wherein the first divider and the second divider are selected such that a difference period arises which is as small as possible in the range of some hundreds, some tens of picoseconds or a few picoseconds, wherein the first frequency (f1) and the second frequency (f2) is synchronized regularly to the master clock (50).

14. A method in accordance with claim 12, wherein the complete periods of the first or second frequencies (f1, f2) are counted, and wherein the time shift is generated as the time interval between the nth period of the first frequency (f1) and the mth period of the second frequency (f2).

15. A method in accordance with claim 12, wherein the time shift is extended by periods of the first frequency (f1), of the second frequency (f2) or of the master clock (50).

* * * * *